Patented May 11, 1943

UNITED STATES PATENT OFFICE 2,319,186

MILK PRODUCT

James D. Ingle, Chicago, Ill., assignor to Industrial Patents Corporation, Chicago, Ill., a corporation of Delaware No Drawing. Application March 16, 1939, Serial No. 262,285

14 Claims. (Cl. 99—56)

This invention relates to an improved dried modified skimmed milk.

One of the objects of this invention is to provide an improved dried modified skimmed milk product.

Another object of this invention is to provide a dried modified skimmed milk product which is particularly useful in the production of bakery products.

Other objects of this invention will become apparent from the description and claims which follow.

In recent years attempts have been made to produce dried skimmed milk powders for use in ice cream, meat products, and bakery goods. Although dried skimmed milk powder has been used in bread-making and constitutes a convenient method of adding milk solids to bread, different samples of dried skimmed milk produce different results in the baked bread. Some of the powdered products have no effect on bread dough, while others retard fermentation or reduce the loaf volume of the baked product. No method of testing dried skimmed milk products with respect to the properties toward bakery products is available.

Two processes most generally used in drying skimmed milk are spray drying and drum drying. Spray drying produces a product which is highly soluble, finely divided, and reasonably free from burnt or other off flavors. Products dried on a heated drum under atmospheric pressure are dried at much higher temperatures than spray dried products and, as a result, the product tends to be much less soluble in water. All dried milk products tend toward flavor defects which are inherently imparted by the drying process, rendering the dried product less desirable for use in the manufacture of bakery goods and the like than condensed milk.

The present invention contemplates modifying skimmed milk prior to drying by the addition of a small proportion of skimmed milk which has been completely digested with a proteolytic enzyme.

In the preferred procedure of practicing the present invention, normal skimmed milk is subjected to the action of a hydrolytic proteolytic enzyme until the milk proteins are completely digested. The completely digested skimmed milk is a yellowish green solution substantially free from turbidity. The enzymes are destroyed or rendered inactive after the skimmed milk has been completely digested by heating the solution, for example, by heating to a temperature of about 190 degrees F. and maintaining the solution at this temperature for about ten minutes. The resulting solution has excellent keeping qualities and may be stored without the danger of any alteration of the solution. A small amount of the digested liquor is thoroughly mixed with skimmed milk, and the modified skimmed milk is then dried in any desired manner to form a dried modified skimmed milk product.

I have discovered that digested skimmed milk in an amount equivalent to from 0.05 per cent to 5 per cent of the skimmed milk produces a satisfactory final product. Examples of hydrolytic proteolytic enzymes which are satisfactory for the purposes of my invention are bromelin, ficin, macin, papain, pepsin, and trypsin.

A specific illustration of the practice of this invention involves treating a quantity of skimmed milk with papain, which is allowed to completely digest the curd. After complete digestion, the enzymatic properties of papain are destroyed by heating the yellowish green solution to a temperature of about 190 degrees F. and maintaining the solution at this temperature for about ten minutes. I have discovered that the addition of from 1 per cent to 2 per cent of the digested product to normal skimmed milk prior to drying produces a very satisfactory final product. The digested skimmed milk is thoroughly mixed with the normal skimmed milk, and the modified skimmed milk is then dried in any desired manner to form the dried modified skimmed milk product.

For a better understanding of the use of the dried modified skimmed milk product of my invention two formulas are set forth illustrating the proportion of ingredients in representative yeast raised doughs. Formula A represents a general bread formula in which skimmed milk powder may or may not be used. Formula B represents a typical bread formula in which skimmed milk powder is used and is a formula which was employed in testing dried skimmed milk and my dried modified skimmed milk.

|  | Formula A | Formula B |
|---|---|---|
|  | Pounds | Pounds |
| Flour | 100 | 100 |
| Yeast | 1½- 3½ | 2 |
| Salt | 1¾- 2½ | 2 |
| Shortening | 2 - 6 | 4 |
| Skimmed milk powder | 0 -12 | 6 |
| Water | 58 -70 | 68 |
| Sugar | 2 - 8 | 6 |
| Mineral yeast food | 0 - 5 | 0.25 |
| Malt | 0 - 2 | 0 |

Dried skimmed milk powders prepared from skimmed milk of different sources produce baked goods such as bread having widely varying texture and volume. Dried powders prepared from milk of the same source but dried at different times also produce bread having a varying texture and volume. These powders appear to affect the fermentation of the dough. I have found that dried modified skimmed milk prepared according to my invention has exceptional properties with respect to bakery goods in that it does not affect the fermentation of the dough. This dried modified skimmed milk produces bread having a better texture and volume than bread prepared from dried skimmed milk. The texture and volume of bread samples prepared from dried modified skimmed milk was found to be uniform regardless of the source of the milk.

I claim:

1. As an article of manufacture, a food product comprising a dried mixture of normal skimmed milk and skimmed milk which has been completely digested with a proteolytic enzyme.

2. As an article of manufacture, a food product comprising a dried mixture of undigested milk and milk which has been completely digested with a proteolytic enzyme.

3. Dried modified skimmed milk which has been modified by the addition of from 0.5 per cent to 10 per cent skimmed milk which has been completely digested with bromelin.

4. As an article of manufacture, a new food product adapted to produce bakery goods of improved texture, uniformity and volume which comprises a dried admixture of skimmed milk and from 0.5 per cent to 10 per cent skimmed milk which has been completely digested with a proteolytic enzyme.

5. Dried modified skimmed milk which has been modified by the addition of from 0.5 per cent to 10 per cent skimmed milk which has been completely digested with pepsin.

6. The method of preparing dried modified skimmed milk products adapted to produce bakery goods of improved texture, uniformity and volume which comprises completely digesting normal skimmed milk with proteolytic enzyme, adding to normal skimmed milk a small proportion of the completely digested skimmed milk, and thereafter drying the modified skimmed milk.

7. The method of preparing dried modified skimmed milk products adapted to produce bakery goods of improved texture, uniformity and volume which comprises completely digesting normal skimmed milk with a proteolytic enzyme, adding to normal skimmed milk from 0.5 per cent to 10 per cent of the completely digested skimmed milk, and thereafter drying the modified skimmed milk.

8. The method of preparing dried modified skimmed milk products adapted to produce bakery goods of improved texture, uniformity and volume which comprises completely digesting normal skimmed milk with a proteolytic enzyme, adding to normal skimmed milk from 1 per cent to 2 per cent of the completely digested skimmed milk, and thereafter drying the modified skimmed milk.

9. The method of preparing dried modified skimmed milk which comprises completely digesting normal skimmed milk with bromelin, adding to normal skimmed milk from 0.5 per per cent to 10 per cent of the completely digested skimmed milk, and thereafter drying the modified skimmed milk.

10. The method of preparing dried modified skimmed milk products adapted to produce bakery goods of improved texture, uniformity and volume which comprises completely digesting normal skimmed milk with papain, adding to normal skimmed milk from 0.5 per cent to 10 per cent of the completely digested skimmed milk, and thereafter drying the modified skimmed milk.

11. The method of preparing dried modified skimmed milk which comprises completely digesting normal skimmed milk with pepsin, adding to normal skimmed milk from 0.5 per cent to 10 per cent of the completely digested skimmed milk, and thereafter drying the modified skimmed milk.

12. As an article of manufacture, a food product comprising a mixture of dried, undigested milk and dried milk which has been completely digested with a proteolytic enzyme.

13. As an article of manufacture, a food product capable of use as an ingredient for bakery goods to improve their texture, uniformity and volume, which comprises a mixture of dried, undigested milk and from 1 per cent to 2 per cent dried milk which has been completely digested with a proteolytic enzyme.

14. As an article of manufacture, a food product comprising a mixture of dried, undigested milk and dried milk which has been completely digested with papain.

JAMES D. INGLE.